Figure 1:
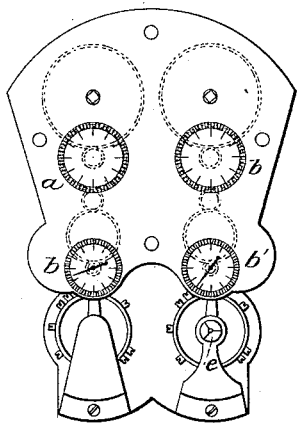

(No Model.)

J. LOGAN.
METHOD OF TESTING AND GRADING BALANCE WHEELS OF WATCHES.

No. 329,915. Patented Nov. 10, 1885.

Witnesses:
Wm. N. Finckel
W. M. Evans.

Inventor:
John Logan
by Crosby & Gregory
attys.

UNITED STATES PATENT OFFICE.

JOHN LOGAN, OF WALTHAM, MASSACHUSETTS.

METHOD OF TESTING AND GRADING BALANCE-WHEELS OF WATCHES.

SPECIFICATION forming part of Letters Patent No. 329,915, dated November 10, 1885.

Application filed June 6, 1883. Serial No. 97,294. (No model.)

*To all whom it may concern:*

Be it known that I, JOHN LOGAN, of Waltham, county of Middlesex, State of Massachusetts, have invented an Improvement in Method of Testing and Grading Watch-Balances, of which the following description, in connection with the accompanying drawings, is a specification, like letters on the drawings representing like parts.

The balances of watches, when of exactly the same weight and made as nearly as possible of the same dimensions and material, will be found to have different rates of vibration when subjected to the same forces, owing to variations in the distribution of the mass, and consequently accurate gaging and weighing is not sufficient to insure uniformity of product. It is also impossible to produce hair-springs of exactly uniform force. As heretofore practiced, the balances made as nearly uniform as possible are weighed, and the springs are tested as to their statical force, and each balance has selected for it a spring having a strength corresponding to its weight, and is placed in the watch or time-keeper, and then made to have the standard rate of vibration by increasing or decreasing the effective strength of the hair-spring, taking it up more or less, and then finally determining its effective length by the regulator of the watch. The balance and spring are thus selected in accordance with their statical weight and strength, instead of what may be called their "vibrational" weight and strength, which are the characteristics that should be considered in selecting them.

In a former patent granted to me July 19, 1870, I have shown and described an apparatus for facilitating the operation of adjusting the hair-spring to the balance with which it is to be used in the time-keeper, and a similar apparatus may be employed for testing and grading the effective or vibrational strength of the hair-springs upon a balance by using the different hair-springs in connection with a standard balance and observing the rate of vibration imparted to the said balance by each hair-spring and grading the said hair-spring accordingly.

The present invention consists partly in thus testing the hair-springs and grading them in accordance with their effective or vibrational strength acting upon a vibrating balance, and also in testing the balances as to their "vibrational" weight, as it may be called, and grading them accordingly, and then selecting for each balance a corresponding spring, by which the standard rate of vibration will be produced, instead of, as heretofore practiced, choosing the spring and balance in accordance with their statical weight and strength, so that possibly, when considered as to their dynamical or vibrational effect, an over strong spring may be used for an under weight balance or the reverse, making the errors of both spring and balance add together instead neutralizing one another in accordance with my invention.

By the terms "strength" and "weight," when used in the remainder of this specification, I mean the vibrational effect of the spring and vibrational weight or moment of inertia of the balance about its axis of oscillation, and the terms "light" and "heavy" refer to the same characteristic.

The balances are tested by subjecting them to the action of the standard vibrating force or to the action of a mainspring, train, and hair-spring, which will give a standard balance the standard number of vibrations—such, for instance, as three hundred to the minute—and observing by comparison with a standard train the number of vibrations of each balance, and grading them accordingly. For instance, if a balance is intended to make three hundred vibrations in a minute and is found to make three hundred and five, it will be graded as three hundred and five, and it will thus be known that it requires a weaker hair-spring than the standard, and a hair-spring previously tested and graded, as before mentioned, will be employed with the said balance of proper strength to give it the standard rate of vibration. The balances and hair-springs selected with relation to each other by this method of operation when put into the watch will run at the standard rate without requiring experimental determination of the point at which to fasten the hair-spring, and by this method one source of variation in different watches will be eliminated and the watches will be more uniform.

Figure 2:
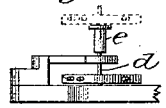

Figure 1 shows in plan view an apparatus for testing watch-balances in accordance with this invention, and Fig. 2 a side elevation of a portion of the said apparatus.

The apparatus includes a standard time-train shown at $a$, preferably having the last or most rapidly-running wheel of the train, provided with a pointer, $b$, co-operating with a dial, the said train being carefully regulated to run at the standard rate. In connection with this train and preferably mounted in the same frame-work is a second train, $c$, the balance-staff $d$ of which is adapted to receive the staffs of the balances to be tested, as shown in dotted lines, Fig. 2, it being in this instance provided with a spring-chuck, $e$, in which the said balance-staffs may be inserted, the balance to be tested thus being vibrated by the train $c$ without its own independent attached hair-spring. The said train $c$ is so constructed that when a standard balance is carried by the chuck $e$ the said train and balance will be vibrated at the standard rate, and the last and most rapidly-rotating wheel of the said train is provided with a pointer, $b'$, co-operating with a dial which will be consequently rotated in unison with the pointer $b$ if the balance in the chuck $e$ is a standard one. If, however, the said balance is too light, the pointer $b'$ will move faster than the pointer $b$, and by the number of divisions which it gains in a definite interval of time—as, for instance, in one minute—will show how much too light the said balance is, or, if the pointer $b'$ looses in relation to the pointer $b$, it will show that the balance being tested is too heavy, and how much too heavy.

The balances when thus tested will be marked or assorted, and all those having the same rate of vibration will be kept together, so that it will be an easy matter to select the proper spring for each balance.

As the statical and dynamical strength of hair-springs is nearly the same, it will in many cases be sufficient to test and grade the springs statically; but when the utmost accuracy is required they should be tested by their effect upon a balance. This can be done by the apparatus shown, the train $c$ and its balance being standard.

The hair-springs to be tested will each be applied to the said balance and have its free or outer end fastened at a definite point. The rate of the balance vibrated by the spring being tested will be compared with the standard rate, and the spring graded accordingly. The springs of a series of watches may thus be all of substantially uniform length.

The apparatus herein shown and described constitutes the subject-matter of my divisional application Serial No. 178,222, filed September 26, 1885.

I claim—

1. The herein-described improvement in the art or method of adjusting springs to balances in time-keepers, which consists in testing a series of springs in connection with a standard balance and grading them in accordance with their effect thereon, and in testing the balances to ascertain their vibrational rate when acted upon by forces of standard strength, and grading them in accordance with the said vibrational rate, and in selecting for each balance a spring of proper strength to give the said balance the standard rate of vibration, substantially as described.

2. The herein-described method of testing and grading balances for time-keepers, which consists in vibrating each balance by forces that will produce in a standard balance the standard or normal rate of vibration, and comparing the rate of vibration of the balance being tested with that of a balance vibrating at standard rate and assorting and grading the said tested balances in accordance with their observed rate, substantially as described.

3. The herein-described improvement in the art or method of adjusting springs to balances in time-keepers, which consists in testing a series of springs and grading them in accordance with their elastic force or strength, and in testing the balances to ascertain their vibrational weight when acted upon by forces of standard strength, and grading them in accordance with the said vibrational rate, and in selecting for each balance a spring of proper strength to give the said balance the standard rate of vibration, substantially as described.

In testimony whereof I have signed my name to this specification in the presence of two subscribing witnesses.

JOHN LOGAN.

Witnesses:
  Jos. P. Livermore,
  B. J. Noyes.